United States Patent
Koeth et al.

(10) Patent No.: US 8,312,469 B2
(45) Date of Patent: Nov. 13, 2012

(54) IMPLICIT INTERACTION OF PORTAL APPLICATION COMPONENTS

(75) Inventors: Oliver Koeth, Stuttgart (DE); Hendrik Haddorp, Holzgerlingen (DE); Stefan Hepper, Holzgerlingen (DE); Stefan Liesche, Boeblingen (DE); Michael Marks, Kirchheim-Teck (DE)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 12/241,252

(22) Filed: Sep. 30, 2008

(65) Prior Publication Data

US 2009/0178056 A1    Jul. 9, 2009

(30) Foreign Application Priority Data

Jan. 8, 2008   (EP) .................................. 08100180

(51) Int. Cl.
   *G06F 3/00*   (2006.01)
(52) U.S. Cl. ........................... 719/310; 719/313; 710/20
(58) Field of Classification Search .................. 719/310, 719/313; 717/20
   See application file for complete search history.

(56) References Cited

U.S. PATENT DOCUMENTS

| | | | | |
|---|---|---|---|---|
| 4,843,541 A | * | 6/1989 | Bean et al. | 710/36 |
| 5,890,014 A | * | 3/1999 | Long | 710/8 |
| 7,730,538 B2 | * | 6/2010 | Fries et al. | 726/24 |
| 2004/0135805 A1 | * | 7/2004 | Gottsacker et al. | 345/751 |

OTHER PUBLICATIONS

Rafael Ballagas, iStuff: A Physical User Interface Toolkit for Ubiquitous Computing Environments, Apr. 2003.*

* cited by examiner

*Primary Examiner* — Lechi Truong
(74) *Attorney, Agent, or Firm* — Daniel McLoughlin; Hoffman Warnick LLC (57) ABSTRACT

The present invention relates to the field of network portals and in particular to a method and system for exchanging data between components of one or more composite applications implemented on a portal server, wherein the components are programmed independently from each other. An embodiment of the invention includes: automatically intercepting I/O data being input or output respectively to or from the components or a browser; extracting data objects from the I/O data; determining for a source component, which of the data objects match input requirements of which other potential target components; selecting matching data objects for a matching target component; and transferring the matching data objects to the matching target component.

9 Claims, 6 Drawing Sheets

PRIOR ART

IMPLICIT INTERACTION OF PORTAL APPLICATION COMPONENTS

FIELD OF THE INVENTION

The present invention relates to the field of network portals and in particular to a method and system for exchanging data between components of one or more composite applications implemented on a portal server, wherein the components are programmed independently from each other.

RELATED ART

In this field, the term "composite application" defines an application hosted on a web portal platform which is built by combining and connecting multiple components such as portlets, wikis, document libraries and web services, for a particular purpose such as a shop or a virtual team room application. A single portal platform may host multiple instances of the same composite application, for example different team rooms for different associated user communities. Composite applications are built from a template describing the contained components and their set-up and interconnection.

Figure 1:
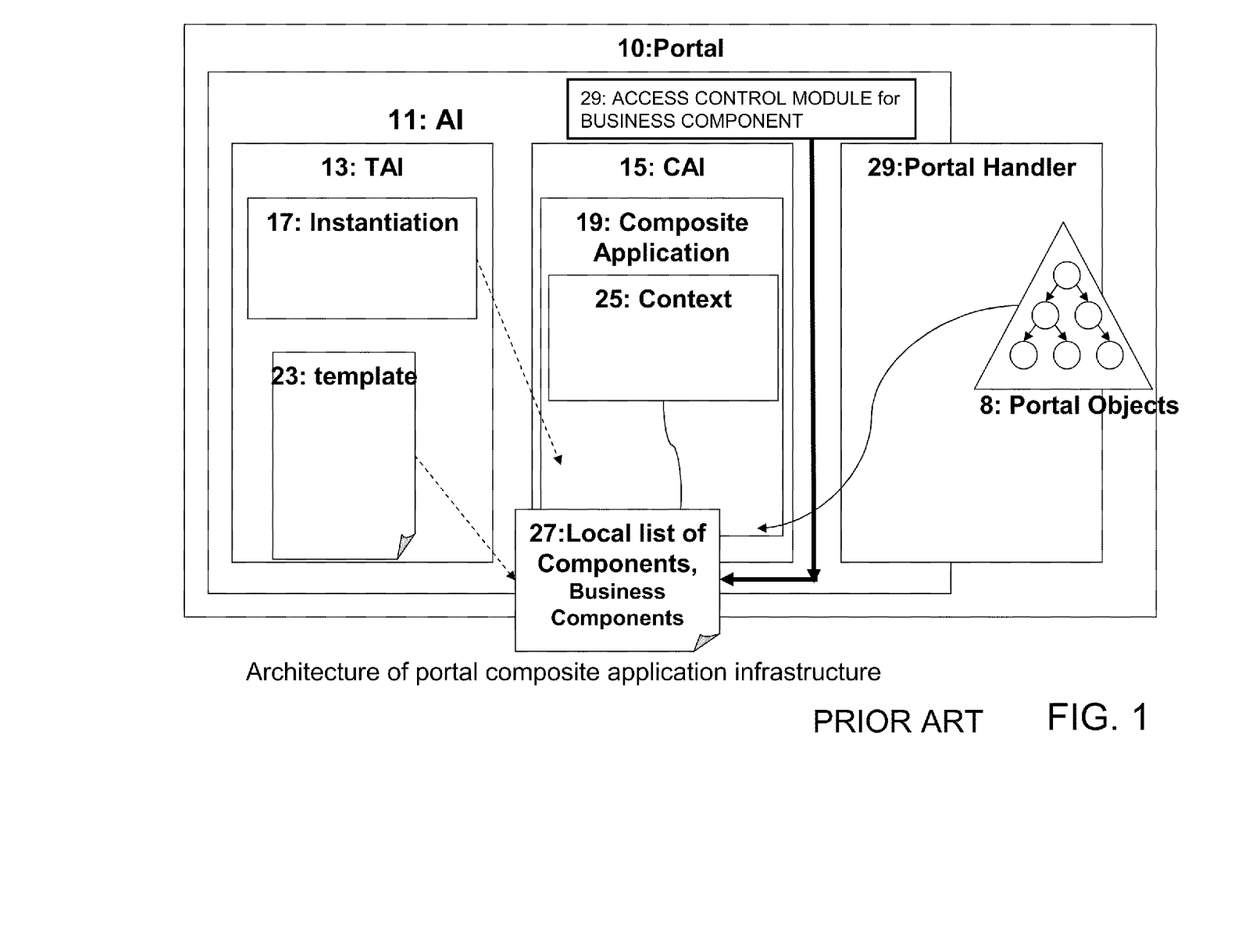
FIGS. 1 and 2 illustrate the structural components of a prior art hardware and software environment used for a prior art method at a portal site.

FIG. 1 shows the overview of the components that build up the prior art application infrastructure 11, abbreviated herein also as AI—system architecture, within an overall portal system 10. The application infrastructure 11 comprises: a templating application infrastructure 13, abbreviated herein also as TAI, that handles the templates in the system and the creation of new composite applications; a composite application infrastructure 15, abbreviated herein also as CAI, that handles the application instances 19 during runtime and manages connections and the data flow between the components of an application; a component registry 27 that manages the business components installed in the system; and a portal handler 29 which is a specific local component that manages any portal related artifacts 8 like pages or portlets for the application infrastructure in the portal, and which is used by the instantiation component 17 to create such artifacts during the creation of a new composite application.

The templating application infrastructure (TAI) component 13 manages the templates 23 in the system which contain references to instantiable components in a local list of components 27. As an example, a template for shopping applications could include a reference to a document library component which is used to hold the available goods and their descriptions, a shop portlet that lets clients process actual shopping transactions, an invoice business component that handles the payment process, and a blogging component that allows clients to comment on their satisfaction.

The TAI component 13 also creates application instances from the templates via an instantiation component 17, which creates separate instances of the referenced business components, typically by creating or copying individual configurations for these components such that multiple application instances can be created from the same template without interfering with each other.

For the above mentioned sample template, the instantiation 17 would, among other things, create an individual storage compartment in the document library, an individual configuration of the invoice component referring to the bank account and an individual configuration for the shop portlet that is set up to display goods from the created document library and to delegate payment processing to the created invoice component instance.

In particular, the instantiation 17 needs to create the necessary portal artifacts like pages that allow interaction with the created composite application, which is typically done by employing a specific handler 29 that creates those portal artifacts 8 and links them with the business components of the application.

Figure 2:
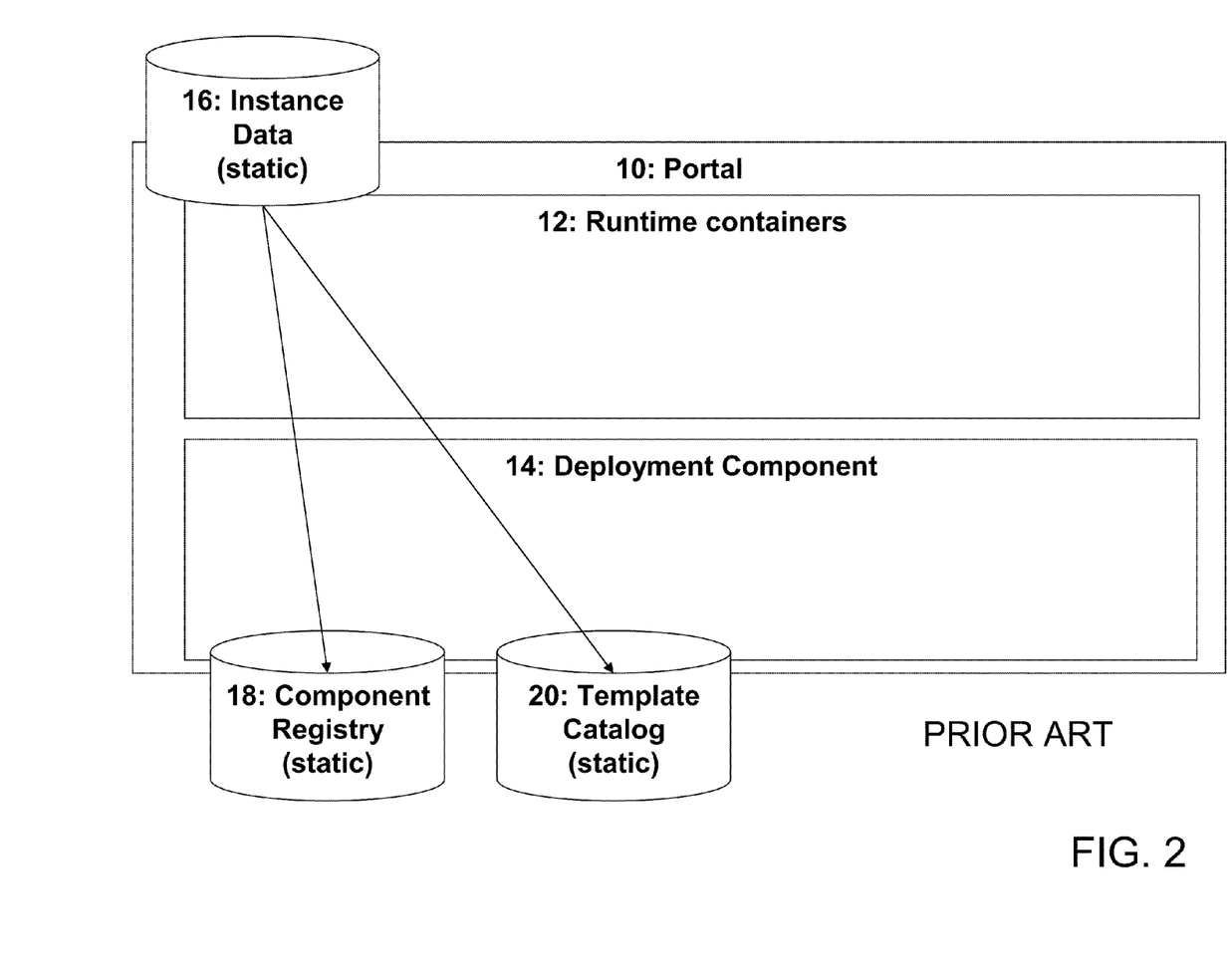

The created composite application instances 19 hold a context 25 that lists the component instances that make up the composite application FIG. 2 shows an overview of the storage components involved in the portal architecture 10 that store deployment related code in a deployment component 14 and a runtime environment in one or more runtime containers 12 where the deployed components are executed.

For the composite application context deployed artifacts can include: application components stored in a component registry 18; and templates stored in a template catalog 20. This data is then referenced by the application's instance specific data 16.

Prior art composite applications are a key concept of the prior art "Service Oriented Architecture" (SOA). They allow end-users to assemble business logic out of a set of given components without programming by simply defining some meta information, such as configuration data and application structure. Prior art composite applications are supported for example by the prior art IBM WebSphere Portal and other known products.

Figure 3:
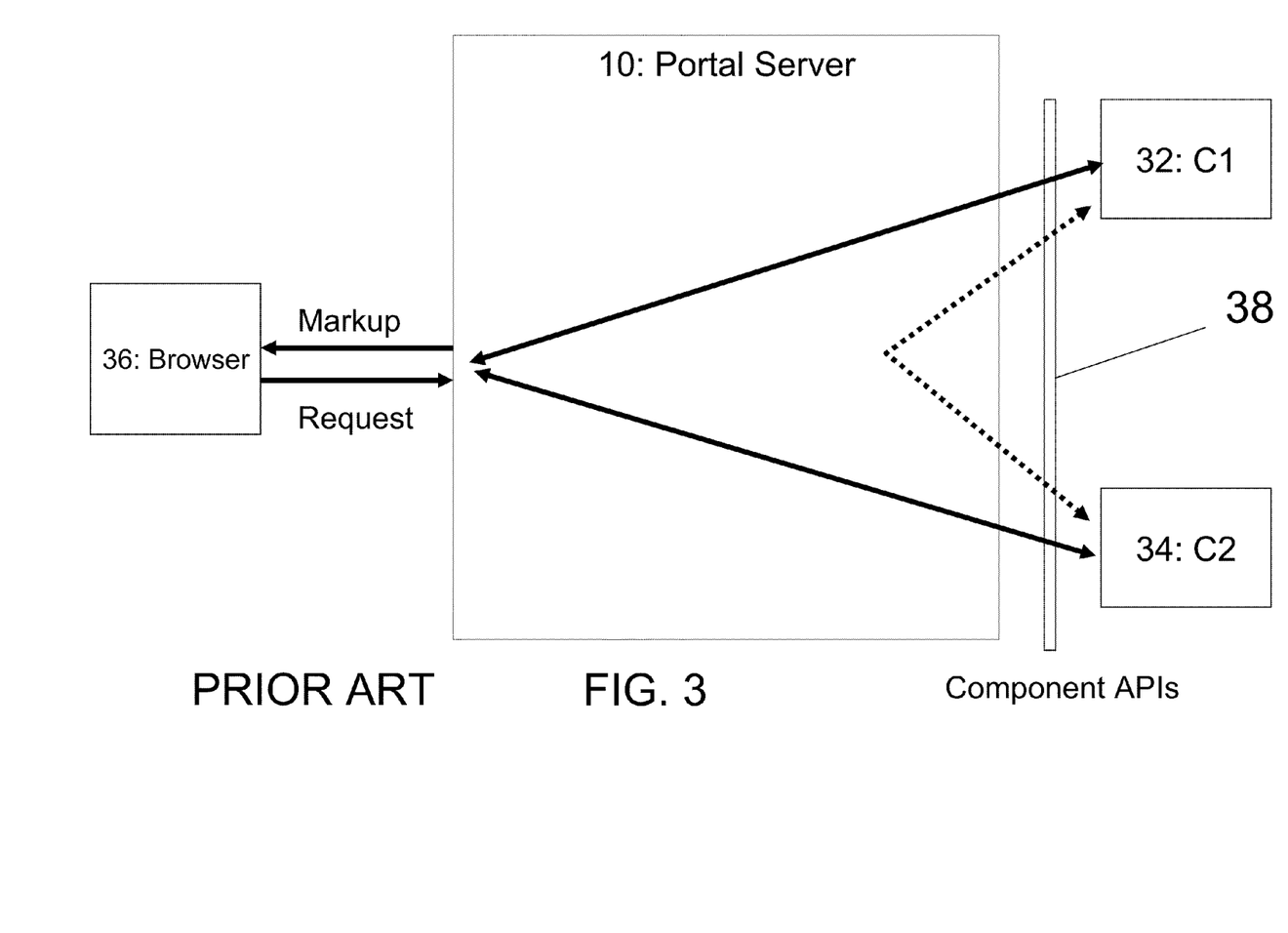
FIG. 3 is block diagram illustrating a high level system view reduced to the components of a prior art portal environment, which are of primary interest for the purposes of the present invention.

With particular focus now to the technical problem underlying the present invention and with reference to FIG. 3 inside a prior art portal server 10 a plurality of application components 32, 34 are running at runtime concurrently. Instead of only two components as depicted in FIG. 3, in order to improve clarity, in a real prior art portal environment hundreds of components are present and run concurrently. The components 32, 34 use specific application programming interfaces 38 for communication with the portal server 10, which is symbolically denoted by the bold vertical line 38. Generally, these prior art APIs are provided by the portal server and are used in specific ways by each component to implement component specific functions. The components are generally produced, i.e., programmed, by distinct programmer persons from generally distinct software vendors. The arrows between the symbolized elements in the schematic diagram of FIG. 3 illustrate data flows. Further details are given with reference to FIG. 4.

Figure 4:
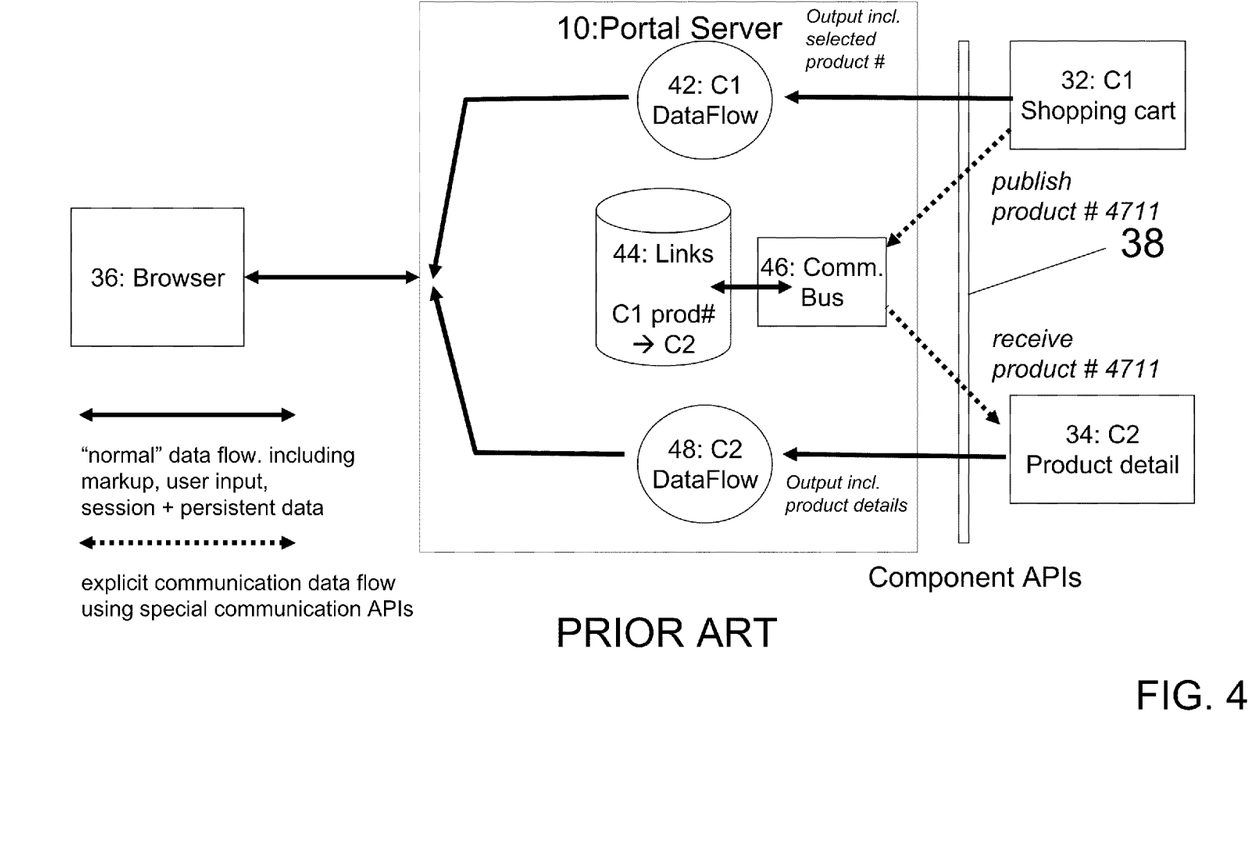
FIG. 4 is a detailed view of FIG. 3, also according to prior art and illustrating the data flows between the depicted elements according to prior art.

With reference now to FIG. 4, prior art components 32, 34 use APIs that are implemented by dataflow and existing storage components inside the portal server 10. In order to do that, for example for component 32, which is a shopping card component, a specific subset of APIs 38, which are not related to inter-component communication, is used by some programmer named A for example of a software vendor X, which uses the dataflow 42 in order to communicate with the portal server application and the browser 36 of a portal end user. The output of component 32 can for example be a product number, when the composite application in question is a web shop and the component 32 is a shopping cart.

The programmer A is using the APIs to implement component-specific functions and without any knowledge of other components in the system or intention to share data with other components.

In the prior art, usually there exist dedicated communication APIs which use a bus component 46 that has a preprogrammed "knowledge" of predefined inter-component connections. So, for example the shopping cart component 32 (C1) publishes the product number "4711" to the communication bus, from where the product detail component 34 (C2) is able to receive this product number. The output of component 34 in turn is a list of product details, which is also communicated via a dedicated API 38 using a preprogrammed dataflow 48 of the portal server 10. This sort of inter-component communication has to be programmed separately from the implementation of the actual component functionality, which is, in the case of the shopping cart, the tracking and display of selected items that a user wants to purchase.

A person skilled in the art will appreciate that a programmer of any component must explicitly define the outputs and inputs including adequate format information with a dedicated communication API.

The communication bus component interacts in the prior art with a link collection which for example stores a link between component 32 and component 34 i.e., a link between C1 and C2 as indicated in FIG. 4, component 44.

In a real portal environment, as it was mentioned already before, several hundreds of components 32, 34 are present. Many of them use similar data. Basically much data in use will be exchanged between the component and the communication bus component 46.

Frequently, the data to be exchanged is provided within some predefined structure, for example a key/value-pair. An example for a key/value-pair is:
Date: 05.08.2007;
Date: 05/8/2007; or
E-mail-address: x@y.z.

Further, frequent data input/output from components include the markup sent to the browser which is commonly in form of a HTML-stream. A further frequent data input is typically input data being input from a user into a request form of his browser.

This data is in the prior art is usually stored either in a session data store, or in a persistent data store, usually a portal database, or temporarily displayed by the browser 36.

Disadvantageously, it is common practice that the components are programmed by different persons from different software vendors. Normally, a programmer of one component is not aware of the existence of another component which is also later used at the same portal server application. So, in general the individual functions of the individual components are developed fully independently from each other, which results in that there is no common awareness of which data would be of interest to other unrelated components or could be provided by other unrelated components and should therefore be communicated to the communication bus 46 from either of the components 32, 34 in order to simplify a reuse of data.

It is, however, common for a portal user to transfer some data being produced by some portlet (i.e., some component) to another component, for example as input data in order to perform some individual business goal. For example, the user performs a purchase in a shop application of the portal server 10, wherein after having completed the purchase procedure he is presented with the future delivered date of the purchased product. Then, the user will of course mark this date within his personal calendar application. In prior art, there is no linkage, however, between the shop application and the calendar application as the developers of both components will typically not have foreseen this sort of interaction and will therefore not have explicitly enabled the components for it. Both applications, however, are hosted at the same portal server, are composite applications, and have been programmed fully independently from each other. So, the date is not automatically transferred from the shop application to the calendar application. This is a clear, simple and concise example for the disadvantages in prior art regarding in sufficient data exchange facilities between single components of different composite applications. This example, however, has a quite larger scope in real life because many data items must be transferred manually by the user from one to the other component, although in prior art these data items basically are stored somewhere at the portal server storage, either in the session storage or in the persistent portal storage.

SUMMARY OF THE INVENTION

The present invention provides a method and system for an improved and simplified data exchange between components of composite applications in a portal server environment.

According to an aspect of the present invention a method and respective system for exchanging data between components of one or more composite application implemented on a portal server are disclosed, wherein the components are programmed independently from each other, the method comprising: automatically intercepting I/O data being input or output respectively to or from the plurality of components; extracting data objects from the I/O data, e.g., by a looking up a list of predetermined key/value pairs, or by parsing the I/O data for matching items; determining for a potential source component, which of the data objects match input requirements of which other potential target components; selecting for a matching target component one or more matching data objects; and transferring the matching data objects to the matching target component.

The matching data are advantageously transferred in response to a predetermined trigger event, wherein a preferred trigger event is a change of matching data in the source component.

The step of extracting the data objects includes a parsing step in which a data object is analyzed if it matches any element of a list of predetermined syntactical patterns.

The method can further include a step of monitoring user actions during which user actions one of the data objects are moved from one component to another component, and by automatically moving data objects of the same source component to the same target component, when the move action has been done twice or more with data objects having the same syntactical grammar.

This helps to adjust the inventional method to the actual needs of the user as the inventional system gets to know the user behavior, learns from it and automates user actions which otherwise would have been explicitly be done by the user himself. Further, the last mentioned features helps to optimize the benefit effects of the inventional method.

BRIEF DESCRIPTION OF THE DRAWINGS

The present invention is illustrated by way of example and is not limited by the shape of the figures of the drawings.

DETAILED DESCRIPTION OF THE INVENTION

Figure 5:
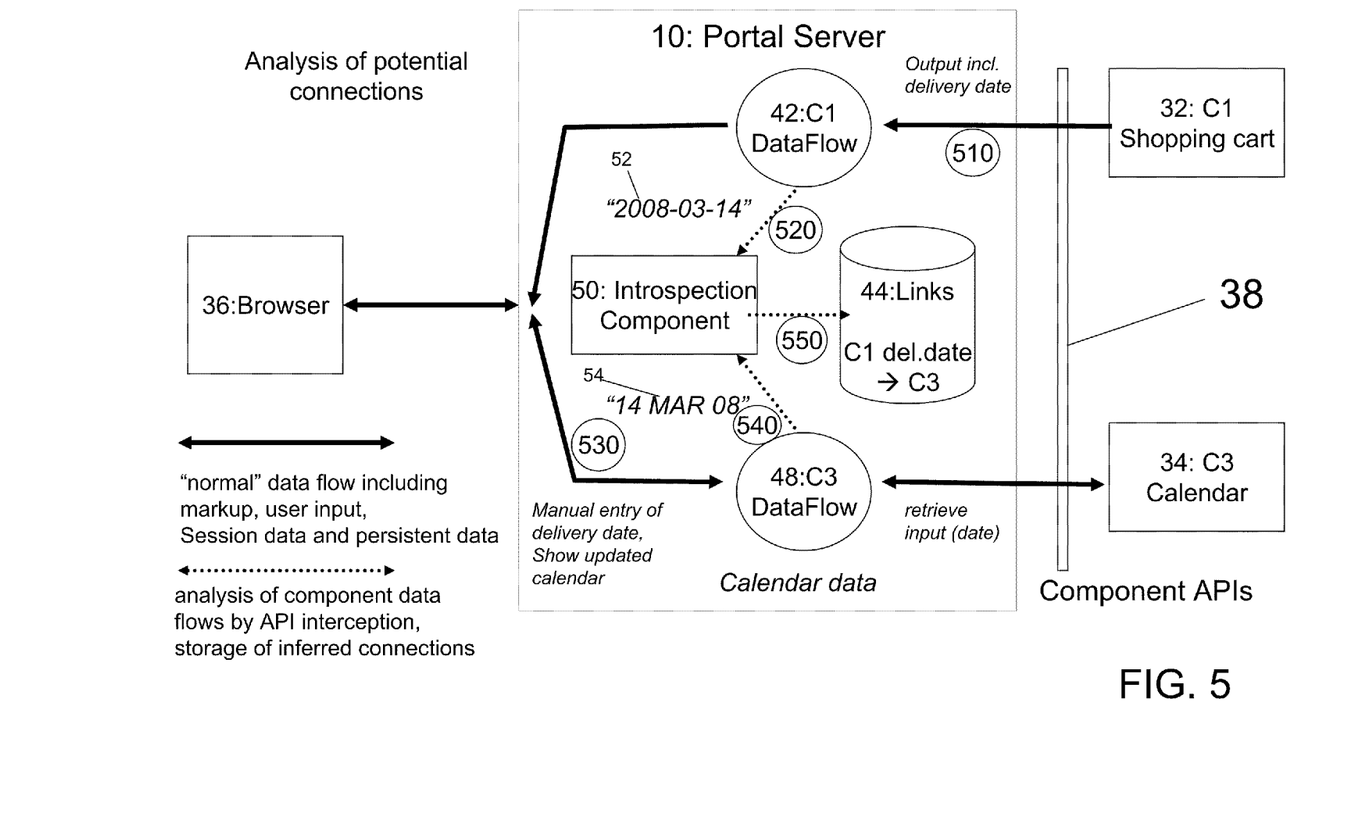
FIG. 5 is a system view according to FIG. 4, enriched by an inventional introspection component which performs an analysis of potential connections between single composite application components according to a first aspect of the inventional method.

With general reference to the figures and with special reference now to FIG. 5 in an embodiment of the inventional method the prior art system is enriched by an inventional introspection component 50 which is connected within the portal server architecture to the communication bus system. This introspection component 50 co-operates with the depicted elements in order to analyze potential connections and coincidences of data input by a user via its browser 36 or output by either of the components exemplarily depicted by reference signs 32 and 34.

In more detail, the control flow of the inventional method used for an exemplary use case including a shopping card component 32 and a calendar component 34 will be described.

In a first step 510 a user is assumed to use the shopping cart component 32 (C1) for purchasing some product. This component 32 then uses portal APIs, in order to modify purchase data and produce some data output. An exemplarily chosen data output item is assumed to be the delivery date of the purchased product. This delivery date item is issued to the communication bus in order to be displayed by the browser 36 of the purchasing user.

According to the present invention the introspection component 50 intercepts the data stream on the communication bus of the portal server 10, catches for example the before mentioned delivery date and analyzes this date, see step 520. Due to a lookup with a pre-stored list of key/value-pairs the introspection component may analyze the data item and will yield a result that the date item is a date item. In case HTML-data is transferred in an unstructured form not matching any key/value-pair the introspection component 50 will extract the unstructured data from the bus, will filter them out and path them for pre-stored and known other data types. In the case that some data is typed-in by the user and a reference data item is already pre-stored and a change in data can be seen relative to the pre-stored data item, such data changes are recorded preferably for the duration of an interactive session of the user accessing the portal, which is typically bounded by log in and log out activities.

In a step 530 it is assumed that data used by the calendar component 34 is updated by manual interaction of the user via its browser 36. In this case, and in a further step 540, the inventional introspection component 50 will also intercept this data stream from browser 36 to calendar component 34, will catch the data ("14 Mar. 2008"), will analyze this data and compare it with already recorded changes and will look for potential communication patterns. Such communication patterns would typically be represented by sequences of requests where the same data, possibly with some format adjustment, appears in the data flows of different components.

So for example in a subsequent step 550 the inventional introspection component will recognize a match of data between the data issued by the shopping card component 32 and the input data input by the user into the browser 36, and will record that the shopping cart component 32 and the calendar component 34 share some data. So it will identify components 32 and 34 as a potential component pair. Due to the fact that the inventional method always tracks the sequence of requests, when a data item was stored by a component or was input by the user, the direction of the link between component 32 and 34 can easily by identified in order to define the shopping card component 32 and a source component and the calendar component 34 as a target component.

In addition to tracking the sequence of requests, the attributes of the request type can be tracked. In this case, in step 510 there is a send request from component 32 to the browser, whereas in case of the manual entry in step 530 the calendar component retrieves some data, wherein this is a receive request at least in view of calendar component 34.

A single occurrence of the same data in two different locations may in itself not represent a safe indication that the user is really transferring data between two components in a way that he would like to be automated. To increase the fidelity of the detection of communication patterns, the introspection component could, for example, wait until it detects that the same pattern occurs, represented by the fact that matching data occurs in the same places of the data sets of components 32 and 34 in the same sequence. Alternatively, the system may show the presumed communication pattern to the user and ask him to confirm that this type of data transfer should be automated in the future.

In the end, however, the shopping card component 32 and the calendar component 34 are identified to be linked via a communication link, which is stored in the link database 44. Further, concurrently to step 550 the calendar component will have retrieved the data item using its portal APIs and will proceed with its own processing, i.e., storing the data at the respective location in its storage area.

It should be noted that the work of creating link in step 550 does not require any programmer because it is not required to use any dedicated communication APIs or data declarations. The links can be inferred even if the communication has not been for seen or intended by the programmers of the respective components forming the communication partners of the before mentioned link.

Figure 6:
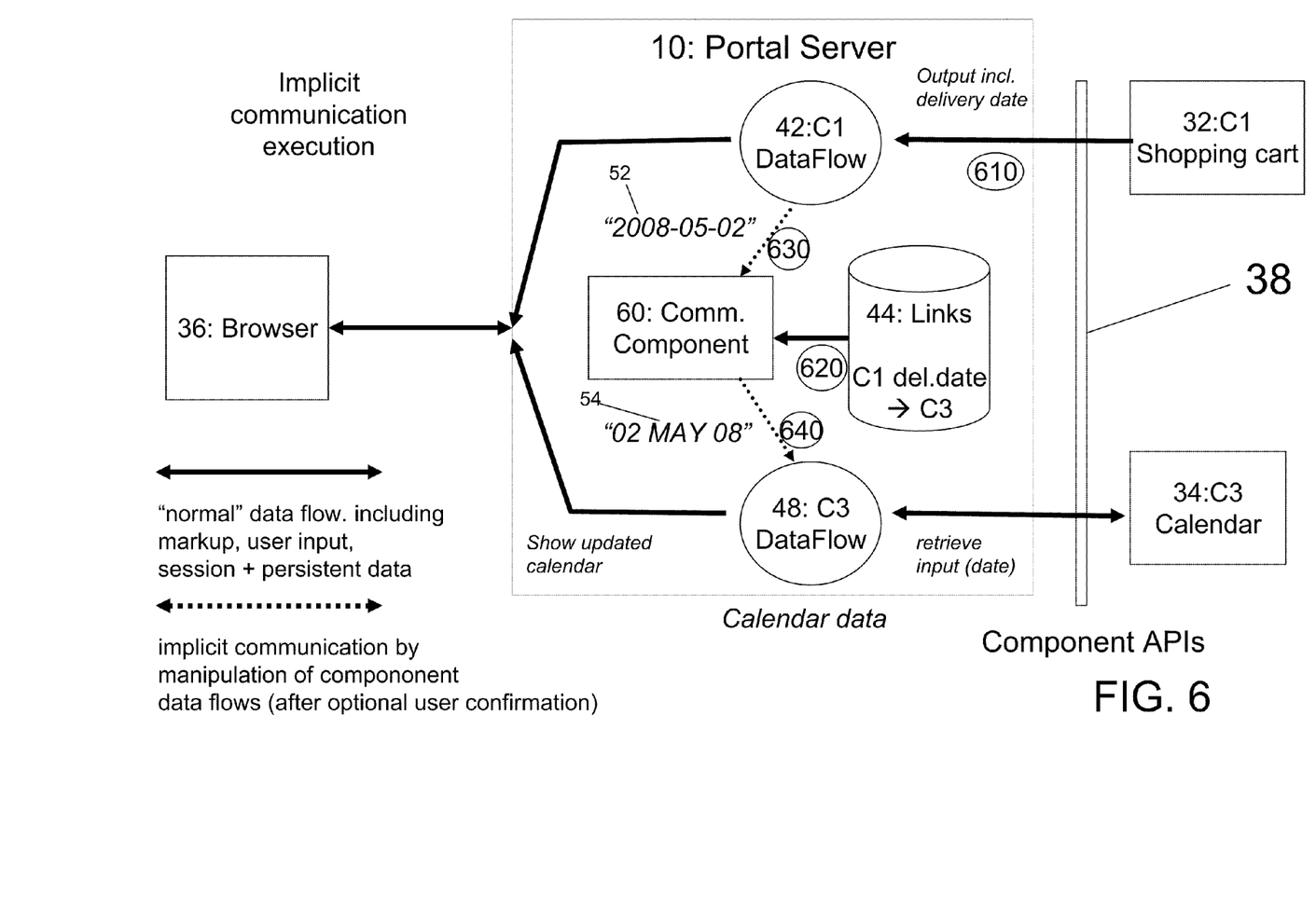
FIG. 6 is a depiction similar to FIG. 5 and disclosing the effect of implicit communication execution according to a second aspect of the inventional method.

With further reference to FIG. 6, a second, inventional aspect will be described in further detail including the execution of an implicit communication between components 32 and 34.

Similar to step 510 in the preceding embodiment the shopping cart component 32 will use its portal APIs in order to modify data or to produce some output data. Here, again in a step 610 a delivery date associated with a purchase of a product will be issued onto the portal communication bus.

Then, in a step 620 an inventional provided communication component, which further enriches the functionality of the preceding described introspection component 50, will again intercept the data stream extract and analyze the data as it was described before and will lookup potential communication links, wherein the shopping component 32 is included. In order to do that the communication component 60 looks up the link database and detects the communication link between component C1 (shopping cart 32) and component C3 (calendar component 34). So, if links are found the communication component 60 retrieves the link source data from the API in a step 630 and will if data is present inject such data into the link target of the link detected in step 620.

It should be noted that the sequence between steps 620 and 630 can also be reversed depending on which operation is more efficient.

Then, the target component, here the calendar component 34, retrieves its data using its portal APIs and will proceed as it was described above. In view of the calendar component 34 the operation performed in steps 620, 630 and 640 looks identical to the respective steps of the description of the embodiment described in FIG. 5. Further, the user will see the same result, which is a correlated update in both components 32 and 34, but without that an explicit manual copying step is required for the user.

Again, it should be stressed that the communication as it is described before and implemented by the inventional method does not require the use of any dedicated communication API. Instead, the communication is an implicit communication because it is implicitly achieved by manipulating the dataflow between the components and the portal.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product stored on and accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of the embodiments of this invention has been presented for purposes of illustration and description. It is not intended to be exhaustive or to limit the invention to the precise form disclosed, and obviously, many modifications and variations are possible.

The invention claimed is:

1. A computer-implemented method for exchanging data between a plurality of components of a composite application implemented on a portal server, wherein the components of the composite application are programmed independently from each other, comprising:
  automatically intercepting I/O data being input or output respectively to or from the components of the composite application or a browser;
  extracting data objects from the I/O data, wherein extracting the data objects includes analyzing a data object to match any of a list of predetermined syntactical patterns;
  determining for a source component of the composite application, which of the data objects match input requirements of which other potential target components of the composite application;
  monitoring user actions during which one of the data objects is moved from one component of the composite application to another component of the composite application, and automatically moving data objects of the same source component of the composite application to the same target component of the composite application, when a move has been done twice or more with data objects having the same or a similar syntactical grammar;
  selecting matching data objects for a matching target component of the composite application, wherein the selecting is in response to at least one repeated match of the determining; and
  transferring the matching data objects to the matching target component of the composite application.

2. The method according to claim 1, wherein matching data is transferred in response to a predetermined trigger event.

3. The method according to claim 2, wherein the trigger event comprises a change of matching data in the source component of the composite application.

4. An electronic data processing system for exchanging data between components of a composite application implemented on a portal server, wherein the components of the composite application are programmed independently from each other, comprising:
  at least one computer hardware device including:
    a system for automatically intercepting I/O data being input or output respectively to or from the components of the composite application or a browser;
    a system for extracting data objects from the I/O data, wherein extracting the data objects includes analyzing a data object to match any of a list of predetermined syntactical patterns;
    a system for determining for a source component of the composite application, which of the data objects match input requirements of which other potential target components of the composite application;
    a system for monitoring user actions during which one of the data objects is moved from one component of the composite application to another component of the composite application, and automatically moving data objects of the same source component of the composite application to the same target component of the composite application, when a move has been done twice or more with data objects having the same or a similar syntactical grammar;
    a system for selecting matching data objects for a matching target component of the composite application, wherein the selecting is in response to at least one repeated match of the determining; and
    a system for transferring the matching data objects to the matching target component of the composite application.

5. The system according to claim 4, wherein matching data is transferred in response to a predetermined trigger event.

6. The system according to claim 5, wherein the trigger event comprises a change of matching data in the source component of the composite application.

7. A computer program product on a non-transitory computer readable storage device for performing a method for exchanging data between components of a composite application implemented on a portal server, wherein the components of the composite application are programmed independently from each other, the method comprising:
  automatically intercepting I/O data being input or output respectively to or from the components of the composite application or a browser;
  extracting data objects from the I/O data, wherein extracting the data objects includes analyzing a data object to match any of a list of predetermined syntactical patterns;
  determining for a source component of the composite application, which of the data objects match input requirements of which other potential target components of the composite application;
  monitoring user actions during which one of the data objects is moved from one component of the composite application to another component of the composite application, and automatically moving data objects of the same source component of the composite application to the same target component of the composite application, when a move has been done twice or more with data objects having the same or a similar syntactical grammar;
  selecting matching data objects for a matching target component of the composite application, wherein the selecting is in response to at least one repeated match of the determining; and
  transferring the matching data objects to the matching target component of the composite application.

8. The computer program product according to claim 7, wherein matching data is transferred in response to a predetermined trigger event.

9. The computer program product according to claim 8, wherein the trigger event comprises a change of matching data in the source component of the composite application.

* * * * *